V. GIEBER.
COTTON STALK CUTTER.
APPLICATION FILED MAR. 8, 1912.
1,031,641.
Patented July 2, 1912.
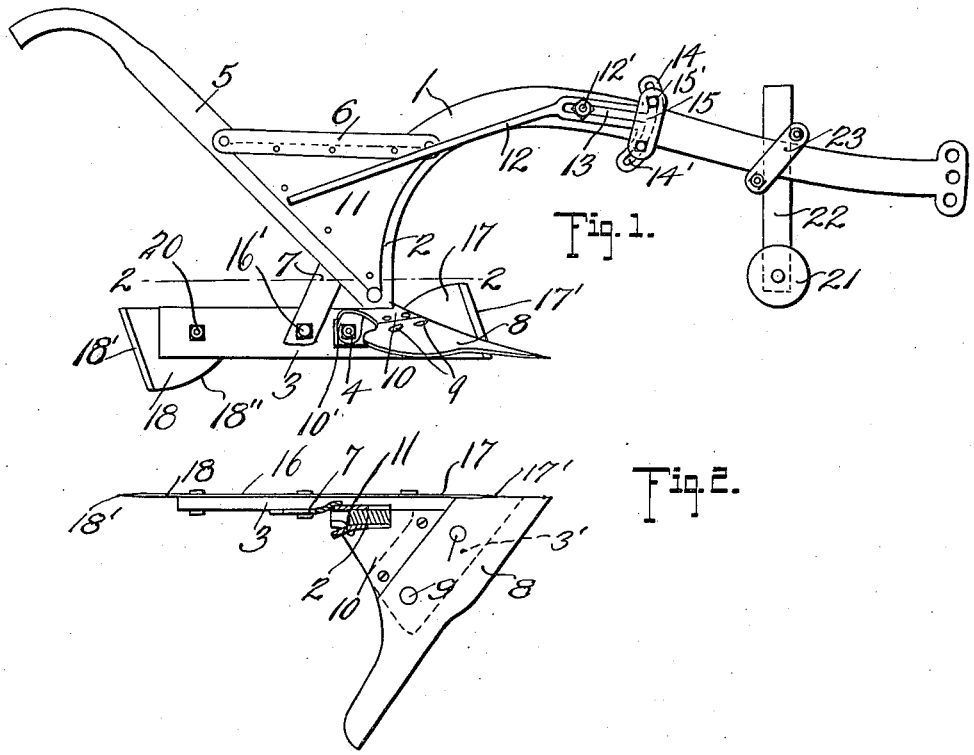
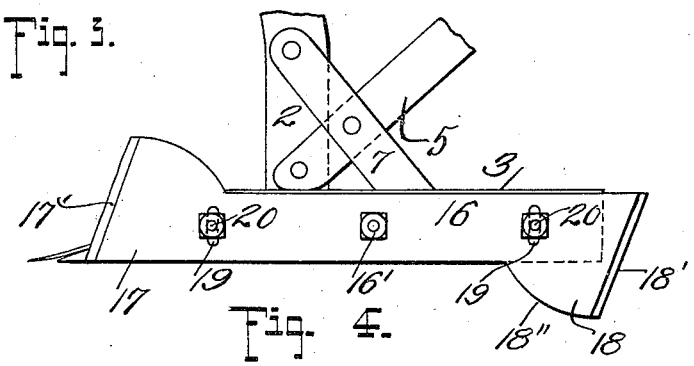
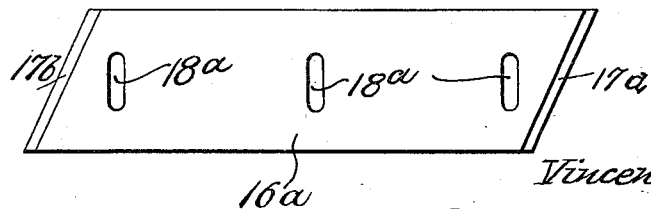
Inventor
Vincent Gieber
Witnesses
By
Attorneys

UNITED STATES PATENT OFFICE.

VINCENT GIEBER, OF COWETA, OKLAHOMA.

COTTON-STALK CUTTER.

1,031,641.  Specification of Letters Patent.  Patented July 2, 1912.

Application filed March 8, 1912. Serial No. 682,341.

*To all whom it may concern:*

Be it known that I, VINCENT GIEBER, a citizen of the United States, residing at Coweta, in the county of Wagoner and State of Oklahoma, have invented certain new and useful Improvements in Cotton-Stalk Cutters, of which the following is a specification.

This invention relates to improvements in cotton stalk cutters, its primary object being to provide a novel attachment for cutters comprising a reversible-land side capable of being adjusted in such a manner that one end thereof will prevent any lateral shifting of the stalk cutter in operation according to the nature of the soil with which it may be used.

A further object of my attachment is to provide for the reversing of the device when its forward cutting edge becomes worn and thereby prolonging the use of said attachment.

For a full understanding of the present invention reference is to be had to the following description and the accompanying drawings, in which—

Figure 1 is a side elevation of a cotton stalk cutter constructed in accordance with my invention; Fig. 2 is a horizontal sectional view on the line 2—2 of Fig. 1; Fig. 3 is an enlarged view showing the application of the land-side, the standard being broken away; and Fig. 4 is a view showing a modified form of my land-side.

Throughout the following detail description and on the several figures of the drawings, similar parts are referred to by like reference characters.

Referring to the drawings and specifically describing my invention, an implement constructed in accordance therewith comprises the beam 1 having the standard 2 thereof secured to a foot or base member 3 by means of bolts 4, or the like. Also secured in a similar manner to the foot 3 are the usual handles 5 and braces 6 and 7 are preferably used to rigidly connect the handles and base member with the standard 2 of the beam 1.

On the lateral projection 3′ of the foot 3 is secured the cutter blade 8, as by means of the bolts 9, and between the upper portion of the cutter blade 8 and the standard 2 is removably secured a dirt shield 10, an extremity 10′ of said shield being bent downwardly and provided with an opening through which one of the bolts 4 securing the standard 2 to the foot 3 passes. The purpose of the shield 10 is evident, it serving to prevent the collection of dirt and other litter at the point of its location. as is the usual tendency in implements of this character. I provide also preferably a shield 11 of triangular form secured in any desired manner between the standard 2, one member of the handle 5, and the brace 6, as most clearly shown in Fig. 1 of the drawings. This shield prevents the stalks or weeds from catching between these parts and materially assists in the use of my implement in connection with cutting of cotton stalks.

A rowing rod 12 is provided, being secured to the side of the beam 1 by means of the bolt 12′ above the cutter blade 8. Said rod extends rearwardly and outwardly, and is slightly inclined downwardly, the purpose of said rod being to shove the stalks or plants to one side as they are being cut. The end of the rod 12 which is secured to the beam 1 is provided with an elongated slot 13 through which the bolt 12′ extends and which permits the adjustment of said rod forwardly or rearwardly, as desired, and supplemental to this adjustment a vertical curved extension 14, provided with an arcuate slot 14′ permits the adjustment of the rod in the vertical plane, the extension 14 being interposed between the clamp member 15 and the beam 1, which is secured in position by means of the bolts 15′ located above and below the beam and passing through the slot 14′.

Describing in detail my attachment, I provide a land-side 16 which is pivotally attached to the foot 3 on the opposite side to the blade 8, by means of the bolt 16′ passing through an opening intermediate the ends of the land-side. The preferred form of my land-side is provided with enlarged end portions 17 and 18 each having their cutting edge 17′ and 18′, said edges extending parallel with each other, as clearly shown in the drawings. Near the enlarged end portions of the land-side 16 are provided arcuate slots 19 through which bolts 20 pass and by means of which bolts the land-side is adjustably secured to the foot bar 3. The particular advantage of the construction of land-side above described is its reversibility, whereby when the cutting edge 17′ becomes worn the land side may be reversed and the edge 18′ performing the cutting function.

The peculiar form of enlarged end not only affords the vertically extending and inclined cutting edge with respect to one end but acts as a heel plate at its opposite end, the purpose of said heel plate being to prevent the tendency of lateral shifting of the implement in operation. The edge 18″ of the end 18 cuts its own path through the soil and the depth to which it may be forced is regulated by means of the adjusting bolts 20, as will be obvious. In loose sandy soil particularly adapted for the growing of cotton a heel plate is required which may extend considerably below the front cutting edge of the land-side, whereas in stiff land the end 18 is preferably elevated when it will perform its function equally as well as before described with respect to the operation in loose soil. As will thus be understood, my form of land-side performs a dual function which, so far as I am aware, has not been heretofore used in any construction of cotton stalk cutter. The reversibility of my land-side furthermore, prolongs its utility very considerably. In Fig. 4 I have shown a modified form of land-side designated 16ª, the shape of which is a parallelogram. The reversible cutting edges of the land-side 16ª are designated as 17ª and 17ᵇ and slots 18ª are provided at each end and centrally of said land-side, by means of which the adjustment described with respect to the preferred construction may be accomplished.

While the cotton stalk cutter herein disclosed may be operated on the surface of the ground its preferred operation is slightly therebeneath and a gage wheel 21 mounted on the lower end of the standard 22, which standard is adjustably mounted on the beam 1 by means of the clamp 23, is provided to regulate the depth of cutting action.

A particular advantage of a cutter constructed in accordance with the foregoing is that it can very readily be attached to a riding lister truck by simply removing the handles, as will be apparent to those skilled in the art to which this invention refers.

Having thus described the invention, what is claimed as new is:

1. In a cotton stalk cutter, the combination of a standard, a base member secured thereto, a cutter secured to said member, and a reversible land-side adjustably secured to the member for movement in a vertical plane, one end of said land-side forming a cutting edge and its opposite end forming a heel plate.

2. The combination with a cotton stalk cutter comprising a beam, a foot, handles and a cutter blade secured thereto, of a vertically disposed land-side pivotally secured intermediate its ends to the foot aforesaid and having vertically arranged slots near its opposite extremities, said land-side being formed with similar shaped end portions one of which acts as a front cutting edge and the other as a heel plate to hold the cutter from lateral movement, and bolts passing through the foot and the slots in the land-side whereby the position of the heel plate may be regulated according to the character of soil in which it is used.

3. The combination with a cotton stalk cutter comprising a beam, a foot, handles and a cutter blade secured thereto, of a vertically disposed reversible land side pivotally secured intermediate its ends to the foot aforesaid and having vertically arranged slots near its opposite extremities, said land-side being formed with similar shaped end portions one of which acts as a front cutting edge and the other as a heel plate to hold the cutter from lateral movement, bolts passing through the foot and the slots in the land-side whereby the position of the heel plate may be regulated according to the character of soil in which it is used, and a dirt shield secured to the foot at the upper portion of the cutter blade.

In testimony whereof I affix my signature in presence of two witnesses.

VINCENT GIEBER.

Witnesses:
   Tom Combs,
   Thos. P. Luker.

---

Copies of this patent may be obtained for five cents each, by addressing the "Commissioner of Patents, Washington, D. C."